(12) United States Patent
Tanabe et al.

(10) Patent No.: US 12,447,799 B2
(45) Date of Patent: Oct. 21, 2025

(54) VEHICLE AIR CONDITIONING SYSTEM AND VEHICLE AIR CONDITIONING METHOD

(71) Applicant: MITSUBISHI HEAVY INDUSTRIES THERMAL SYSTEMS, LTD., Tokyo (JP)

(72) Inventors: Hirotaka Tanabe, Tokyo (JP); Takayuki Kobayashi, Tokyo (JP); Yasutaka Aoki, Tokyo (JP); Tomoki Hase, Tokyo (JP); Hideaki Tatenoi, Tokyo (JP); Masayuki Sakai, Tokyo (JP); Michiaki Nakanishi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 164 days.

(21) Appl. No.: 18/280,913

(22) PCT Filed: Mar. 29, 2022

(86) PCT No.: PCT/JP2022/015454
§ 371 (c)(1),
(2) Date: Sep. 7, 2023

(87) PCT Pub. No.: WO2022/230556
PCT Pub. Date: Nov. 3, 2022

(65) Prior Publication Data
US 2024/0149640 A1 May 9, 2024

(30) Foreign Application Priority Data
Apr. 28, 2021 (JP) ................. 2021-075617

(51) Int. Cl.
*B60H 1/00* (2006.01)
*B60H 1/32* (2006.01)

(52) U.S. Cl.
CPC ..... *B60H 1/00899* (2013.01); *B60H 1/00885* (2013.01); *B60H 1/32284* (2019.05);
(Continued)

(58) Field of Classification Search
CPC ............ B60H 1/00899; B60H 1/00885; B60H 1/32284; B60H 2001/00928; B60H 2001/00961
See application file for complete search history.

(56) References Cited

U.S. PATENT DOCUMENTS 4,325,224 A * 4/1982 Howland ............... G05D 23/20
62/196.2
4,478,274 A * 10/1984 Naganoma ......... B60H 1/00971
165/204
(Continued)

FOREIGN PATENT DOCUMENTS

GB 2075724 A * 11/1981 ........... B60H 1/3211
JP 2001-246930 A 9/2001
(Continued)

OTHER PUBLICATIONS

International Preliminary Report on Patentability and English translation of the Written Opinion of the International Searching Authority for International Application No. PCT/JP2022/015454, dated Nov. 9, 2023.

*Primary Examiner* — Ljiljana V. Ciric
(74) *Attorney, Agent, or Firm* — BIRCH, STEWART, KOLASCH & BIRCH, LLP

(57) ABSTRACT

A vehicle air conditioning system includes a refrigerant circuit, a heat medium circuit, a vehicle-interior heat exchanger, a vehicle-exterior heat exchanger including a first heat exchanger and a second heat exchanger disposed in series with respect to a flow of air generated by an air blower, a switching unit, a detection unit for detecting a degree of frost formation, and a control device. The opera- (Continued)

tion mode includes a defrosting mode in which the heat medium in the high-temperature medium circuit is supplied to a defrosting target to be selected as either the first or second heat exchanger by the operation of the switching unit. The control device selects, as the defrosting target, the first heat exchanger in preference to the second heat exchanger when determined that both the first and the second heat exchangers need to be defrosted.

7 Claims, 6 Drawing Sheets

(52) U.S. Cl.
CPC .............. *B60H 2001/00928* (2013.01); *B60H 2001/00961* (2019.05)

(56) References Cited

U.S. PATENT DOCUMENTS

| 5,284,025 | A | * | 2/1994 | Kajitani | B60L 3/0061 |
| | | | | | 62/238.7 |
| 7,089,754 | B2 | * | 8/2006 | Chin | F25B 13/00 |
| | | | | | 62/324.1 |
| 7,266,962 | B2 | * | 9/2007 | Montuoro | F25B 49/02 |
| | | | | | 307/64 |
| 9,937,771 | B2 | * | 4/2018 | Suzuki | B60H 1/04 |
| 11,397,035 | B2 | * | 7/2022 | Kato | F24F 3/06 |
| 11,892,188 | B2 | * | 2/2024 | Jaber | F24F 11/61 |
| 12,160,712 | B2 | * | 12/2024 | Kobayashi | B60H 1/32284 |
| 12,281,828 | B2 | * | 4/2025 | In | F25B 41/31 |
| 2013/0291577 | A1 | * | 11/2013 | Miyakoshi | B60H 1/00899 |
| | | | | | 62/151 |
| 2015/0040594 | A1 | * | 2/2015 | Suzuki | F25B 41/24 |
| | | | | | 62/159 |
| 2017/0253105 | A1 | | 9/2017 | Allgaeuer et al. | |
| 2024/0034124 | A1 | * | 2/2024 | Kim | B60H 1/00278 |
| 2024/0149640 | A1 | * | 5/2024 | Tanabe | B60H 1/32284 |
| 2024/0157756 | A1 | * | 5/2024 | Miyakoshi | B60H 1/00921 |
| 2024/0157757 | A1 | * | 5/2024 | Shigeta | B60H 1/00278 |

FOREIGN PATENT DOCUMENTS

| JP | 2015-7491 A | 1/2015 |
| JP | 2017-133823 A | 8/2017 |
| JP | 2018-128243 A | 8/2018 |
| WO | WO 2020/230564 A1 | 11/2020 |

* cited by examiner (a)

(b)

VEHICLE AIR CONDITIONING SYSTEM AND VEHICLE AIR CONDITIONING METHOD

TECHNICAL FIELD

The present disclosure relates to an air conditioning system installed in a vehicle, the air conditioning system including a refrigerant circuit and a heat medium circuit, and to an air conditioning method using the air conditioning system.

BACKGROUND ART

In a vehicle such as an electric vehicle in which waste heat of an engine cannot be utilized, there is a need for heat management and waste heat utilization of on-board equipment such as a battery in addition to air conditioning functions required for the vehicle such as cooling, heating, dehumidification, and ventilation in a situation in which a heat source tends to be insufficient. In response to such a need, in addition to an electric heater and a heat pump system, a plurality of systems such as a system including a chiller for cooling a battery and a system for conveying water heated by waste heat of a radiator to a thermal load with a pump have been used.

A proposed vehicle air conditioning system in which air conditioning and heat management can be integrated is a system including a primary loop in which a refrigerant circulates in accordance with a refrigeration cycle and a secondary loop in which a heat medium (water) that exchanges heat with the refrigerant in the primary loop is conveyed to on-board equipment with a pump (for example, Patent Document 1).

The vehicle air conditioning system described in Patent Document 1 includes a low-pressure refrigerant-water heat exchanger that exchanges heat between a low-pressure refrigerant and water, a high-pressure refrigerant-water heat exchanger that exchanges heat between a high-pressure refrigerant and water, a vehicle-interior heat exchanger that exchanges heat between water and vehicle interior air, a vehicle-exterior heat exchanger that exchanges heat between water and outside air, and a plurality of valves for switching a direction of a flow of water.

Such a vehicle system further includes a heater used for a defrosting operation to reliably melt frost attached to the vehicle-exterior heat exchanger during a heating operation. Water heated by the heater is supplied to the vehicle-exterior heat exchanger.

CITATION LIST

Patent Literature

Patent Document 1: JP 5971202 B

SUMMARY OF INVENTION

Technical Problem

To enhance heating capacity, the inventors of the present disclosure have studied practical application of a novel vehicle air conditioning system including two or more vehicle-exterior heat exchangers that causes a heat medium to absorb heat from air as a heat source.

There is no known example of an air conditioning system including a refrigerant circuit and a heat medium circuit including two or more vehicle-exterior heat exchangers. The heating capacity during a defrosting operation is desirably secured by taking appropriate measures against frost formation on the vehicle-exterior heat exchangers.

In view of the above, an object of the present disclosure relates to an improvement in a vehicle air conditioning system including a refrigerant circuit and a heat medium circuit and including a plurality of vehicle-exterior heat exchangers for exchanging heat between outside air and a heat medium and an improvement in a vehicle air conditioning method.

Solution to Problem

The present disclosure is a vehicle air conditioning system including: a refrigerant circuit in which a refrigerant circulates in accordance with a refrigeration cycle; a heat medium circuit including a high-temperature medium circuit in which a heat medium absorbing heat from the refrigerant in the refrigerant circuit circulates and a low-temperature medium circuit in which a heat medium dissipating heat to the refrigerant in the refrigerant circuit circulates; a vehicle-interior heat exchanger configured to exchange heat between the heat medium and air; a vehicle-exterior heat exchanger configured to exchange heat between the heat medium and air and including a first heat exchanger and a second heat exchanger disposed in series with respect to a flow of air generated by an air blower; a switching unit configured to switch a flow of the heat medium; a detection unit configured to detect a degree of frost formation on each of the first heat exchanger and the second heat exchanger; and a control device configured to control operation of the switching unit in accordance with an operation mode of the vehicle air conditioning system.

The operation mode includes a defrosting mode in which the heat medium in the high-temperature medium circuit is supplied to a defrosting target to be selected as either the first heat exchanger or the second heat exchanger connected in parallel in the heat medium circuit by the operation of the switching unit.

In selecting the defrosting target by the operation of the switching unit and on the basis of the detection result of a degree of frost formation by the detection unit, the control device selects the first heat exchanger as the defrosting target when it is determined that only the first heat exchanger needs to be defrosted, selects the second heat exchanger as the defrosting target when it is determined that only the second heat exchanger needs to be defrosted, and selects, as the defrosting target, the first heat exchanger located on an upwind side in preference to the second heat exchanger located on a downwind side when it is determined that both the first heat exchanger and the second heat exchanger need to be defrosted.

The present disclosure is an air conditioning method using a vehicle air conditioning system. The vehicle air conditioning system includes: a refrigerant circuit in which a refrigerant circulates in accordance with a refrigeration cycle; a heat medium circuit including a high-temperature medium circuit in which a heat medium absorbing heat from the refrigerant circulates and a low-temperature medium circuit in which a heat medium dissipating heat to the refrigerant circulates; a vehicle-interior heat exchanger configured to exchange heat between the heat medium and air; a vehicle-exterior heat exchanger configured to exchange heat between the heat medium and air and including a first heat exchanger and a second heat exchanger disposed in series with respect to a flow of air generated by an air blower; and a switching unit configured to switch a flow of the heat medium.

The air conditioning method of the present disclosure includes: in supplying the heat medium in the high-temperature medium circuit to a defrosting target to be selected as either the first heat exchanger or the second heat exchanger connected in parallel by the operation of the switching unit and on the basis of the detection result of a degree of frost formation on each of the first heat exchanger located on an upwind side and the second heat exchanger located on a downwind side, selecting the first heat exchanger as the defrosting target when it is determined that only the first heat exchanger needs to be defrosted, selecting the second heat exchanger as the defrosting target when it is determined that only the second heat exchanger needs to be defrosted, and selecting, as the defrosting target, the first heat exchanger in preference to the second heat exchanger when it is determined that both the first heat exchanger and the second heat exchanger need to be defrosted.

Advantageous Effects of Invention

In the vehicle air conditioning system and the vehicle air conditioning method according to the present disclosure, the necessity of defrosting of each of the first heat exchanger and the second heat exchanger is determined on the basis of a degree of frost formation, and either the first heat exchanger or the second heat exchanger is selected as the defrosting target while the first heat exchanger on the upwind side is given preference to the second heat exchanger on the downwind side.

Accordingly, when the flow rate of air flowing through the second heat exchanger decreases due to an increase in air resistance caused by the frost formation on the first heat exchanger on the upwind side, the high-temperature medium is supplied to the first heat exchanger before the supply of the high-temperature medium to the second heat exchanger on the downwind side, thus melting the frost of on the first heat exchanger to recover the amount of heat exchanged by the first heat exchanger and allowing the air passage of the first heat exchanger required for recovering the amount of heat exchanged by the second heat exchanger to be maintained.

Defrosting processing on the first heat exchanger performed in preference to defrosting processing on the second heat exchanger allows the high-temperature medium to be distributed to a vehicle interior side and a vehicle exterior side to be effectively used to recover the amount of heat exchanged by each of the first heat exchanger and the second heat exchanger and the frost formation on the first heat exchanger on the upwind side to be maintained to such an extent that an air flow rate is not excessively reduced while the defrosting mode is performed.

Accordingly, the present disclosure allows a heating capacity above a certain level to be maintained not only in a heating mode but also in the defrosting mode and allows the defrosting mode to finish early and the heating mode to be resumed in the entire of the first heat exchanger and the second heat exchanger by supplying the high-temperature medium to the right place at the right time.

BRIEF DESCRIPTION OF DRAWINGS

FIG. 1 illustrates an example of respective paths of a low-temperature medium and a high-temperature medium in a cooling mode.

DESCRIPTION OF EMBODIMENTS

An embodiment of the present disclosure will be described below with reference to the accompanying drawings.

Overall Configuration

Figure 1:
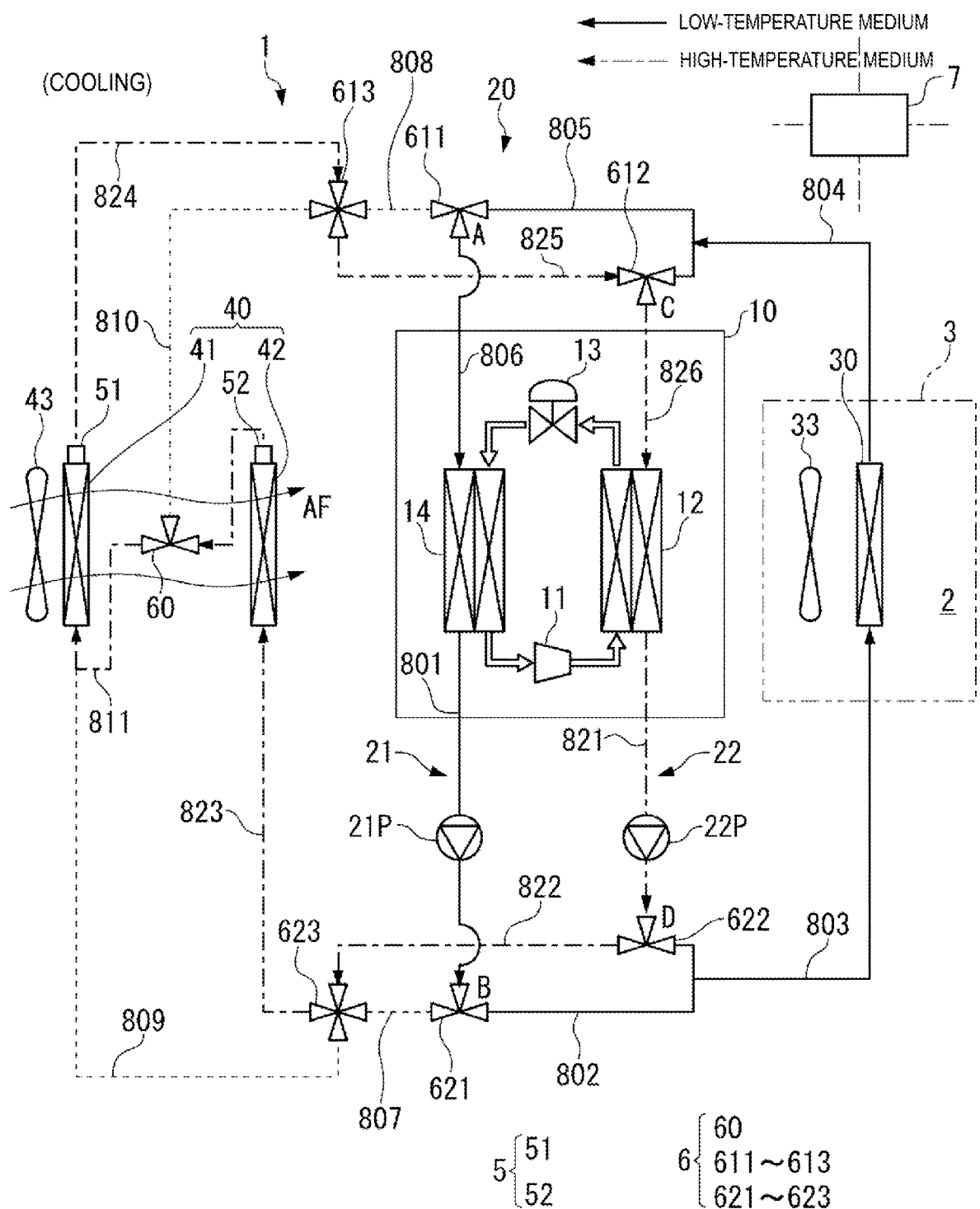
FIG. 1 is a diagram schematically illustrating a vehicle air conditioning system according to an embodiment of the present disclosure.

A vehicle air conditioning system 1 illustrated in FIG. 1 is installed in a vehicle such as an electric vehicle which is not illustrated. The vehicle air conditioning system 1 performs heat management, waste heat recovery, and the like of on-board equipment, which is not illustrated, mounted on the vehicle in addition to air conditioning such as cooling, heating, dehumidifying, and ventilating in a vehicle cabin 2 in which a passenger sits.

Note that the vehicle in which the vehicle air conditioning system 1 is installed is not limited to an electric vehicle, and may be a vehicle equipped with an engine.

The vehicle air conditioning system 1 includes, as main components, a refrigerant circuit 10 in which a refrigerant circulates in accordance with a refrigeration cycle, a heat medium circuit 20 in which a heat medium that exchanges heat with the refrigerant circulates, a vehicle-interior heat exchanger 30, a blower 33 for the vehicle-interior heat exchanger 30, a plurality of vehicle-exterior heat exchangers 40 (41, 42), a blower 43 for the vehicle-exterior heat exchangers 40 (41, 42), a detection unit 5 for detecting degrees of frost formation on the vehicle-exterior heat exchangers (41, 42), a switching unit 6 configured to switch a flow of the heat medium in the heat medium circuit 20, and a control device 7 configured to control operation of the switching unit 6 in accordance with an operation mode of the vehicle air conditioning system 1.

Figure 2:
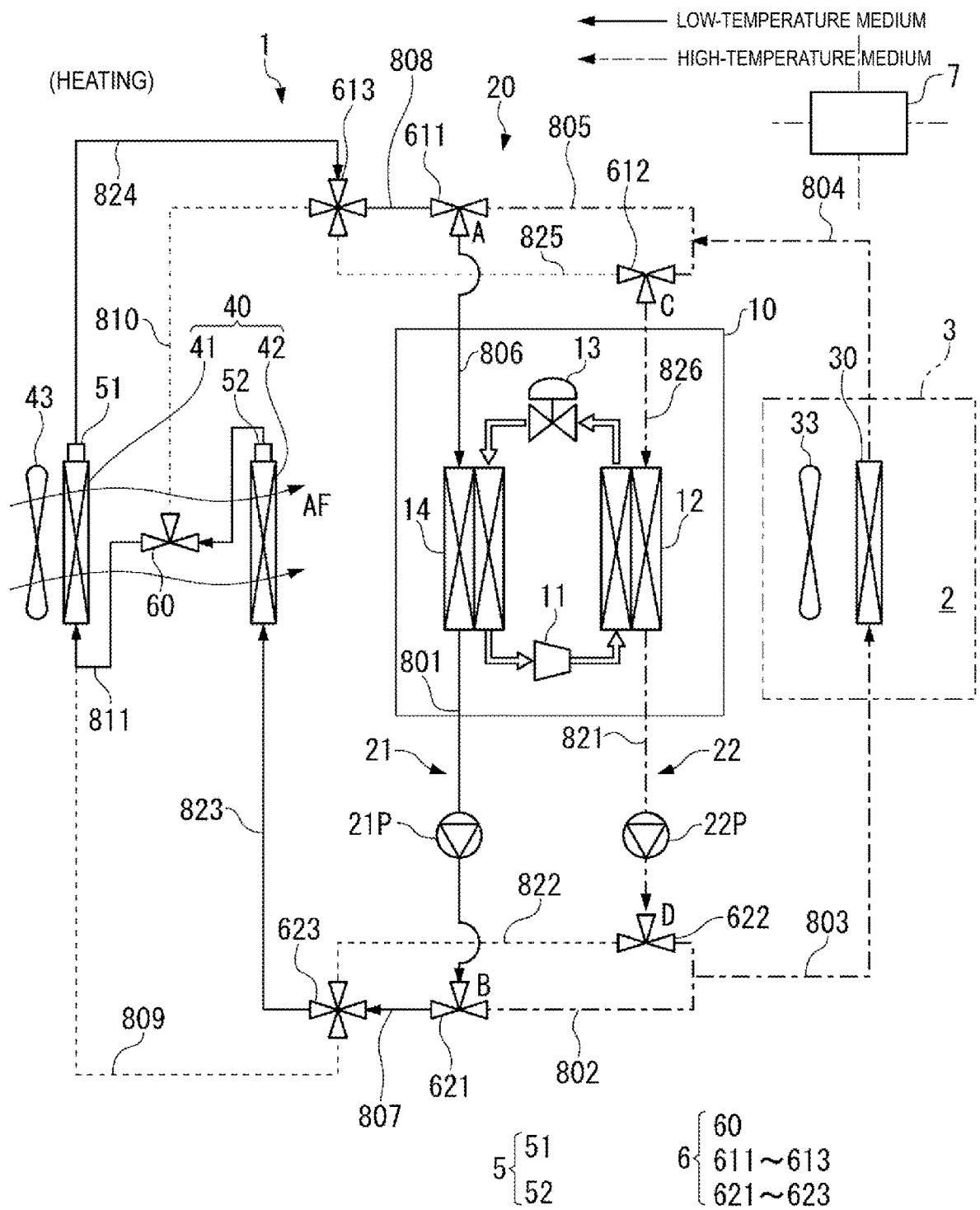
FIG. 2 is a diagram illustrating an example of respective paths of the low-temperature medium and the high-temperature medium in a heating mode.
Figure 3:
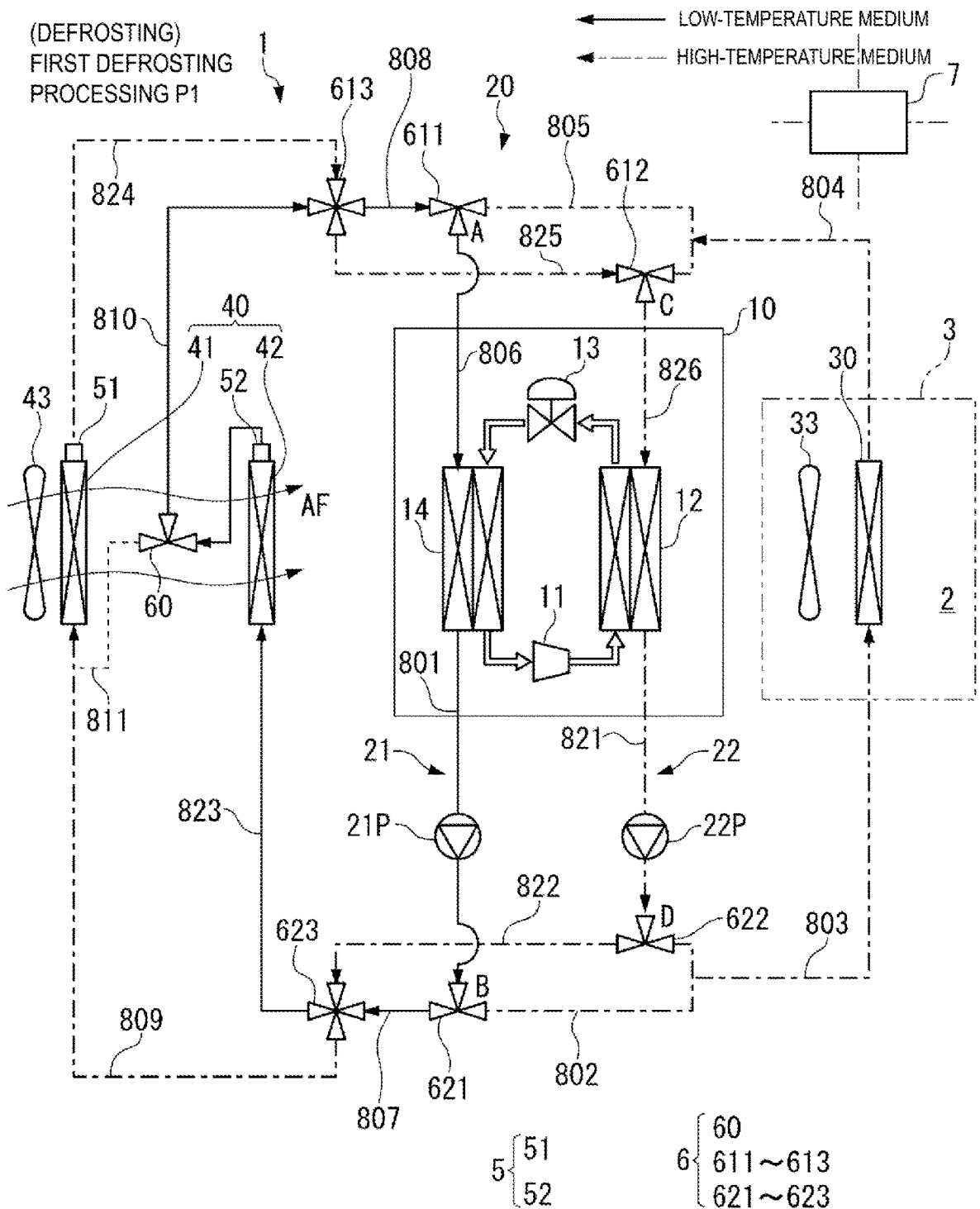
FIG. 3 is a diagram illustrating an example of respective paths of the low-temperature medium and the high-temperature medium during first defrosting processing in a defrosting mode.
Figure 4:
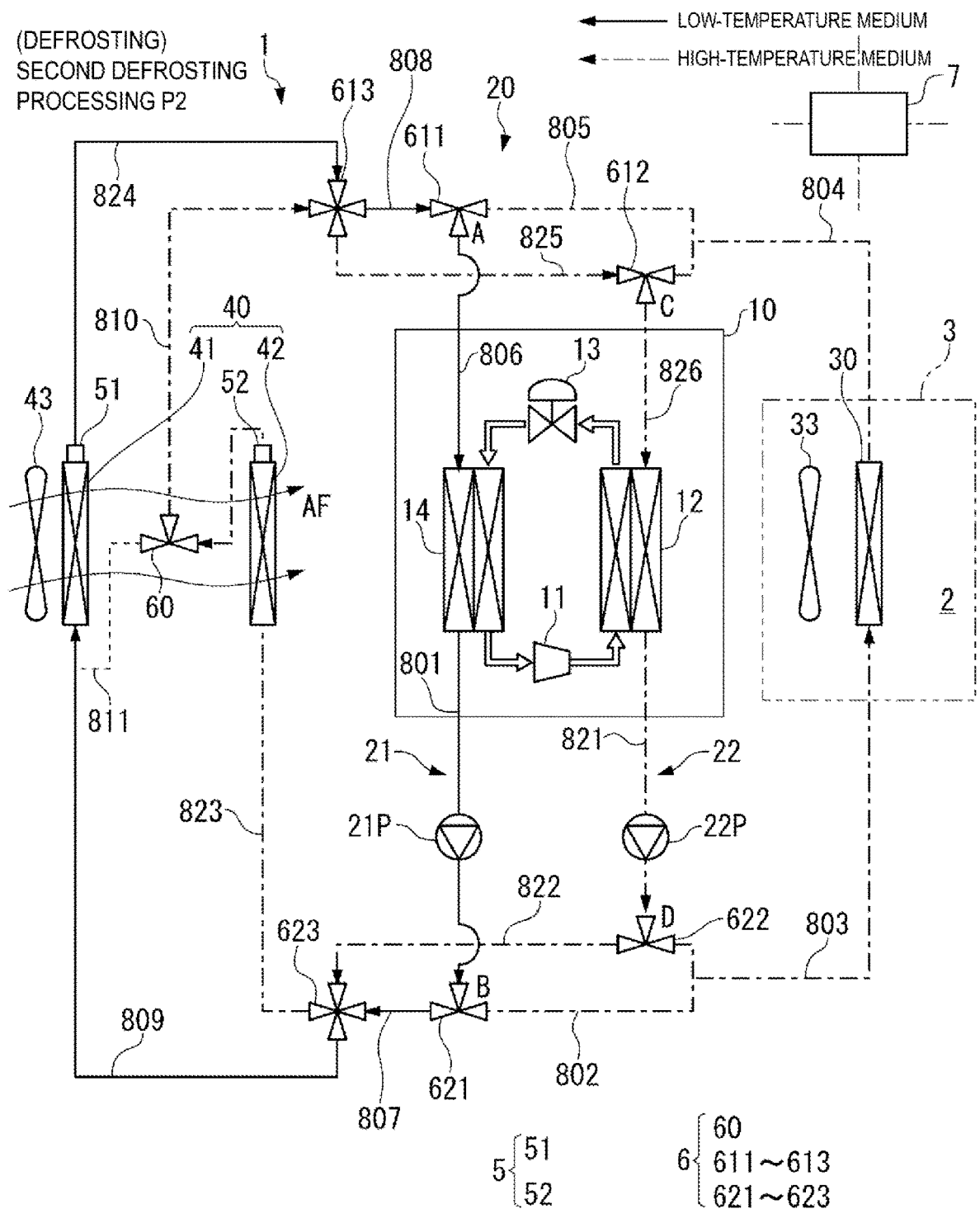
FIG. 4 is a diagram illustrating an example of respective paths of the low-temperature medium and the high-temperature medium during second defrosting processing in the defrosting mode.

The vehicle air conditioning system 1 has an operation mode such as a cooling mode illustrated in FIG. 1 and a heating mode illustrated in FIG. 2 as well as defrosting modes illustrated in FIGS. 3 and 4.

The vehicle air conditioning system 1 of the present embodiment performs a defrosting operation on the basis of the degree of frost formation on each of the plurality of vehicle-exterior heat exchangers 40 (41, 42) as will be described later.

The operation mode required for the vehicle air conditioning system 1 varies depending on a region where a vehicle is used. For example, the vehicle air conditioning system 1 does not need to have a cooling mode.

Refrigerant Circuit

The refrigerant circuit 10 includes a compressor 11 for compressing the refrigerant, a heat-absorbing heat exchanger 12, an expansion valve 13 as a decompression unit for reducing a pressure of the refrigerant that has passed through the compressor 11 and the heat-absorbing heat exchanger 12, and a heat-dissipating heat exchanger 14. The refrigerant circuit 10 generates a heat source for a heat medium (heat-absorbing heat exchanger 12) and a cold source for a heat medium (heat-dissipating heat exchanger 14) by the refrigeration cycle.

The compressor 11, the heat-absorbing heat exchanger 12, the expansion valve 13, the heat-dissipating heat exchanger 14, and refrigerant pipes connecting these elements are installed outside the vehicle cabin 2.

As the refrigerant, a publicly-known appropriate single refrigerant or mixed refrigerant can be used. For example, a hydrofluorocarbon (HFC) refrigerant such as R410A or R32, a hydrofluoroolefin (HFO) refrigerant such as R1234ze or R1234yf, a hydrocarbon (HC) refrigerant such as propane or isobutane can be used, or carbon dioxide can be used as the refrigerant.

The heat-absorbing heat exchanger 12 causes the heat medium to absorb heat from the refrigerant through heat exchange between a refrigerant gas discharged from the compressor 11 and the heat medium. The heat exchange between the refrigerant and the heat medium in the heat-absorbing heat exchanger 12 typically changes the refrigerant into a liquid phase. In this case, the heat-absorbing heat exchanger 12 is equivalent to a condenser.

The heat-dissipating heat exchanger 14 causes the heat medium to dissipate heat to the refrigerant through heat exchange between the refrigerant that has passed through the expansion valve 13 and the heat medium. The heat-dissipating heat exchanger 14 is equivalent to an evaporator. The refrigerant changed into a gas phase in the heat-dissipating heat exchanger 14 is sucked into the compressor 11.

The refrigerant circulates in the refrigerant circuit 10 by a difference between a pressure of the refrigerant in the heat-absorbing heat exchanger 12 and a pressure of the refrigerant in the heat-dissipating heat exchanger 14.

Heat Medium Circuit

The heat medium circuit 20 conveys the heat medium that exchanges heat with the heat source and the cold source made by the refrigerant circuit 10 to the vehicle-interior heat exchanger 30 and the vehicle-exterior heat exchangers (41, 42). The heat medium can be used for air conditioning in the vehicle cabin 2 as well as heat management such as heating and cooling of on-board equipment and waste heat recovery from the on-board equipment. The on-board equipment is, for example, a drive source such as an electric motor, a drive circuit unit, and a power supply device including a battery.

The heat medium is a liquid such as water or brine that circulates in the heat medium circuit 20 while keeping in a liquid phase. The brine that can be exemplified includes a mixed liquid of water and propylene glycol or a mixed liquid of water and ethylene glycol.

In the heat medium circuit 20, a heat medium having a relatively high temperature (high-temperature medium) and a heat medium having a relatively low temperature (low-temperature medium) each circulate. In both the cooling mode and the heating mode, the high-temperature medium absorbs heat from the refrigerant in the heat-absorbing heat exchanger 12, and the low-temperature medium dissipates heat to the refrigerant in the heat-dissipating heat exchanger 14.

In FIG. 1, the flow of the low-temperature medium is indicated by solid arrows, and the flow of the high-temperature medium is indicated by dashed-dotted arrows. In the heat medium circuit 20, a path through which the heat medium does not flow is indicated by a dashed line. The same applies to FIG. 2 and subsequent drawings.

The high-temperature medium circulates through a predetermined path in the heat medium circuit 20 according to an operation mode as indicated by, for example, the dashed-dotted arrows in FIG. 1. The low-temperature medium circulates through a path in the heat medium circuit 20 according to an operation mode as indicated by, for example, solid arrows in FIG. 1.

The heat medium circuit 20 is divided into a low-temperature medium circuit 21 in which the low-temperature medium circulates and a high-temperature medium circuit 22 in which the high-temperature medium circulates by the switching unit 6 that switches the flow of the heat medium. FIG. 1 illustrates A to D in the heat medium circuit 20. Only the low-temperature medium flows from A to B. Only the high-temperature medium flows from C to D. In the remaining sections of the heat medium circuit 20, either the low-temperature medium or the high-temperature medium flows according to an operation mode. The high-temperature medium is pumped through the high-temperature medium circuit 22 by a pump 22P located downstream of the heat-absorbing heat exchanger 12. The low-temperature medium is pumped through the low-temperature medium circuit 21 by a pump 21P located downstream of the heat-dissipating heat exchanger 14.

Even if an outside temperature is so low that it is difficult for the refrigerant circuit 10 alone to provide a heating capacity, the heating capacity at a low outside temperature can be ensured by using, in combination with the refrigerant circuit 10 the heat medium circuit 20 stably conveying the heat medium that does not change in phase in an operating temperature range with the pumps 21P and 22P.

In the cooling mode (FIG. 1), the low-temperature medium circulates between the heat-dissipating heat exchanger 14 and the vehicle-interior heat exchanger 30 through pipes of the heat medium circuit 20 and used for cooling in the vehicle cabin 2. At this time, the high-temperature medium circulates between the heat-absorbing heat exchanger 12 and the vehicle-exterior heat exchangers (41, 42) through pipes of the heat medium circuit 20.

On the other hand, in the heating mode (FIG. 2), the high-temperature medium circulates between the heat-absorbing heat exchanger 12 and the vehicle-interior heat exchanger 30 and used for heating in the vehicle cabin 2. At this time, the low-temperature medium circulates between the heat-dissipating heat exchanger 14 and the vehicle-exterior heat exchangers (41, 42).

In either operation mode, the heat medium circuit 20 supplies the high-temperature medium to the vehicle-interior heat exchanger 30 and at least one of the vehicle-exterior heat exchangers (41, 42), and supplies the low-temperature medium to the vehicle-interior heat exchanger 30 and at least one of the vehicle-exterior heat exchangers (41, 42).

Vehicle-Interior Heat Exchanger

The vehicle-interior heat exchanger 30 is disposed inside a console, a wall, or the like of the vehicle cabin 2, and exchanges heat between the low-temperature medium or the high-temperature medium supplied and air inside the vehicle cabin 2.

The vehicle-interior heat exchanger 30 constitute a heating, ventilation, and air conditioning (HVAC) unit 3 together with the blower 33, a duct through which air sent by the blower 33 flows, a damper whose degree of opening can be adjusted, and the like.

The vehicle-interior heat exchanger 30 is composed of a single heat exchanger or a plurality of heat exchangers disposed in series with respect to the flow of air caused by the blower 33.

When the vehicle-interior heat exchanger 30 is composed of a plurality of heat exchangers, for example, two heat exchangers, opening and closing a valve provided between the heat exchangers can switch the two heat exchangers in a series connection or in a parallel connection for the flow of the heat medium. The flow of the heat medium sequentially flowing through the two heat exchangers connected in series and the flow of the air sequentially flowing through the two heat exchangers preferably form counterflows.

When the two heat exchangers as the vehicle-interior heat exchanger 30 are connected in parallel, the low-temperature medium can be supplied to one of the two heat exchangers and the high-temperature medium can be supplied to the other. This can perform a dehumidification heating mode of reducing the amount of water vapor in air by causing the low-temperature medium to remove heat from the air and then obtaining conditioned air by causing the high-temperature medium to heat the air to obtain. In the dehumidification heating mode, the low-temperature medium is supplied to the heat exchanger on an upwind side and the high-temperature medium is supplied to the heat exchanger on a downwind side.

Air inside the vehicle cabin 2 or outside the vehicle cabin 2 sucked by the blower 33 is supplied to the vehicle-interior heat exchanger 30 through the duct, and air cooled by heat exchange with the low-temperature medium or air heated by heat exchange with the high-temperature medium in the vehicle-interior heat exchanger 30 is blown out into the vehicle cabin 2 from an outlet not illustrated.

Vehicle-Exterior Heat Exchanger

The first heat exchanger 41 and the second heat exchanger 42 exchange heat between air (outside air) taken in from the outside of the vehicle cabin 2 by the blower 43 (air blower) and the low-temperature medium or the high-temperature medium. By the first heat exchanger 41 and the second heat exchanger 42, the high-temperature medium that is higher in temperature than the outside air radiates heat to the outside air in the cooling mode illustrated in FIG. 1, and the low-temperature medium that is lower in temperature than the outside air absorbs heat from the outside air in the heating mode illustrated in FIG. 2. According to heat absorption by the plurality of vehicle-exterior heat exchangers (41, 42), it is possible to ensure sufficient heating capacity in the air conditioning system 1 mounted on a vehicle such as an electric vehicle in which a heat source tends to be insufficient.

The first heat exchanger 41 and the second heat exchanger 42 are disposed in series with respect to a flow AF given to air by the blower 43. The first heat exchanger 41 is disposed on an upstream side (upwind side) of the flow of air caused by the blower 43. The second heat exchanger 42 is disposed on a downstream side (downwind side) of the flow of air caused by the blower 43. Thus, the air caused to flow by the blower 43 sequentially flows through the first heat exchanger 41 and the second heat exchanger 42 in this order.

The first heat exchanger 41 and the second heat exchanger 42 are connected via an intermediate valve 60. The connection of the first heat exchanger 41 and the second heat exchanger 42 can be switched to series connection or parallel connection with respect to the flow of the heat medium in the heat medium circuit 20 by the switching unit 6 including the intermediate valve 60.

The first heat exchanger 41 and the second heat exchanger 42 as the vehicle-exterior heat exchangers are connected in series in both the cooling mode in which the high-temperature medium is supplied to these heat exchangers as illustrated in FIG. 1 and the heating mode in which the low-temperature medium is supplied to these heat exchangers as illustrated in FIG. 2.

In a case of the series connection, the second heat exchanger 42 is located upstream and the first heat exchanger 41 is located downstream in the heat medium circuit 20 regardless of an operation mode such as cooling or heating. That is, the heat medium flows through the second heat exchanger 42 and the first heat exchanger 41 from the downwind side to the upwind side.

Here, the flow of the heat medium sequentially flowing through the second heat exchanger 42 and the first heat exchanger 41 and the flow of the air sequentially flowing through the first heat exchanger 41 and the second heat exchanger 42 form counterflows. Thus, heat exchange can be efficiently performed while temperature differential between air and the heat medium is sufficiently maintained throughout an entire heat exchange process by the first heat exchanger 41 and the second heat exchanger 42.

During a heating operation, drain water or moisture in air condenses on the surfaces of the first heat exchanger 41 and the second heat exchanger 42 to form frost. As the frost grows, the resistance of the air passing through gaps (air passages) between members such as fins and tubes included in the heat exchangers 41 and 42 increases and the air flow rate decreases. As a result, a heat exchange amount decreases and heating performance decreases. If the air passages are completely blocked by further growth of the frost, heat exchange between outside air and the heat medium cannot be performed.

To avoid a decrease in the amount of heat exchanged due to a decrease in the air flow rate, in the present embodiment, the frost is melted by supplying the high-temperature medium in accordance with necessity of defrosting based on the degree of frost formed on the first heat exchanger 41 and the second heat exchanger 42 (degree of frost formation).

The degree of frost formation on the vehicle-exterior heat exchangers is a degree related to an amount of formed frost that affects the flow rate of the air flowing through the air passages, and specifically, corresponds to a thickness of accumulated frost, a density of frost, or the like.

The more the amount of attached frost is, the larger the degree of blockage of the air passages by the frost is. As the blockage of the air passages progresses, the heat medium supplied to the heat exchangers becomes unable to absorb heat from air, and is decreased in temperature by being cooled by the frost. That is, the degree of frost formation correlates with the temperature of the heat medium flowing through the heat exchangers. In the present embodiment, as will be described later, a temperature sensor is used to detect the degree of frost formation.

It is desirable to defrost the heat exchanger that needs to be defrosted while the vehicle cabin 2 is continuously heated to secure occupant comfort. For this reason, in the defrosting mode, the high-temperature medium is distributed to the vehicle-interior heat exchanger 30 and the vehicle-exterior heat exchangers (41, 42), whereby the vehicle cabin 2 is heated by the supply of the high-temperature medium to the vehicle-interior heat exchanger 30 while the heating capacity is suppressed to a necessary minimum, and the high-temperature medium is supplied to a defrosting target selected as either the first heat exchanger 41 or the second heat exchanger 42.

In order to secure a heating capacity above a certain level during operation in the defrosting mode, instead of supplying the high-temperature medium to the two heat exchangers 41 and 42 at the same time, the high-temperature medium is supplied to the heat exchangers 41 and 42 one-by-one in accordance with the necessity of defrosting. Thus, in the defrosting mode, the first heat exchanger 41 and the second heat exchanger 42 are connected in parallel, and the supply destination of the high-temperature medium is switched between the first heat exchanger 41 and the second heat exchanger 42 by the operation of the switching unit 6. That is, when the high-temperature medium is supplied to one of the first heat exchanger 41 and the second heat exchanger 42, the low-temperature medium is supplied to the other.

The degree of frost formation on the first heat exchanger 41 located on the upwind side and the degree of frost formation on the second heat exchanger 42 located on the downwind side are not necessarily the same. When the frost grows on the first heat exchanger 41 on the upwind side, the air resistance increases and the air flow rate decreases due to the frost. Consequently, even if no frost is formed on the second heat exchanger 42, the heat exchange capacity of the second heat exchanger 42 is also decreases with a decrease in the flow rate of the air flowing through the air passages of the second heat exchanger 42.

When the air flow rate decreases due to the frost formation on the first heat exchanger 41, the heat exchange capacity of the second heat exchanger 42 is not recovered even when the high-temperature medium is supplied to the second heat exchanger 42 to melt the frost formed on the second heat exchanger 42. In order to secure the heat exchange capacity of the second heat exchanger 42, the air passages of the first heat exchanger 41 need to be maintained by performing the defrosting of the first heat exchanger 41 before the defrosting of the second heat exchanger 42.

Therefore, in the present embodiment, necessity of defrosting is determined based on the degree of frost formation on each of the first heat exchanger 41 and the second heat exchanger 42, and the defrosting of the first heat exchanger 41 on the upwind side is performed in preference to the defrosting of the second heat exchanger 42 on the downwind side. When it is determined that the defrosting of the first heat exchanger 41 is necessary from the degree of frost formation on the first heat exchanger 41, the defrosting of the first heat exchanger 41 is immediately performed regardless of the necessity of defrosting of the second heat exchanger 42. As will be described later, the defrosting of the second heat exchanger 42 is performed only when it is determined that the defrosting of the first heat exchanger 41 is not necessary.

Detection Unit

The detection unit 5 includes a first temperature detection unit 51 that can detect temperature information indicating a temperature decrease of the heat medium due to the frost formation on the first heat exchanger 41, and a second temperature detection unit 52 that can detect temperature information indicating a temperature decrease of the heat medium due to the frost formation on the second heat exchanger 42.

The first temperature detection unit 51 of the present embodiment corresponds to a temperature sensor for detecting the temperature of the heat medium that has flowed through, wholly or partway, a path of the heat medium from an inlet to an outlet set for the first heat exchanger 41. The first temperature detection unit 51 is preferably installed at or near the outlet of the heat medium of the first heat exchanger 41. For example, the first temperature detection unit 51 is installed in a pipe at the outlet of the first heat exchanger 41 so as to be in indirect contact with the heat medium, or in direct contact with the heat medium flowing through the outlet.

Similarly, the second temperature detection unit 52 corresponds to a temperature sensor for detecting the temperature of the heat medium that has flowed through, wholly or partway, a path of the heat medium from an inlet to an outlet set for the second heat exchanger 42 by being in indirect or direct contact with the heat medium. The second temperature detection unit 52 is preferably installed at or near the outlet of the heat medium of the second heat exchanger 42.

As described above, the temperature of the heat medium that has flowed through the vehicle-exterior heat exchangers (41, 42) varies depending on the degree of blockage of the air passages related to the degree of frost formation.

Thus, the first temperature detection unit 51 detects the degree of frost formation on the first heat exchanger 41 by detecting the temperature of the heat medium flowing through the first heat exchanger 41. Similarly, the second temperature detection unit 52 detects the degree of frost formation on the second heat exchanger 42 by detecting the temperature of the heat medium flowing through the second heat exchanger 42.

Without being limited to the present embodiment, the first temperature detection unit 51 may include two or more temperature sensors. In that case, for example, one temperature sensor may be installed at each of the inlet and the outlet of the first heat exchanger 41, a temperature differential between the temperature of the heat medium at the inlet and the temperature of the heat medium at the outlet may be acquired on the basis of the temperatures detected by the temperature sensors, and the degree of frost formation may be detected on the basis of the temperature differential. The same applies to the second temperature detection unit 52.

Switching Unit

The switching unit 6 includes the above-described intermediate valve 60 located between the first heat exchanger 41 and the second heat exchanger 42, and upstream valves 611 to 613 and downstream valves 621 to 623 disposed in the heat medium circuit 20. The switching unit 6 switches the respective flows of the high-temperature medium and the low-temperature medium by these valves 60, 611 to 613, and 621 to 623.

Each of the valves 60, 611 to 613, and 621 to 623 is a solenoid valve, and is opened and closed in accordance with a control command issued by the control device 7.

Each of the intermediate valve 60, the upstream valve 611, and the upstream valve 612 described above is a three-way valve, and the upstream valve 613 is a four-way valve. Each of the downstream valve 621 and the downstream valve 622 is a three-way valve, and the downstream valve 623 is a four-way valve. The ports of each valve are selectively opened or closed in accordance with an operation mode, and the heat medium flows through the heat medium circuit 20 along a flow path set inside each valve.

The upstream valves 611 to 613 are located upstream in the heat medium circuit 20 with respect to the heat-absorbing heat exchanger 12 and the heat-dissipating heat exchanger 14. The downstream valves 621 to 623 are located downstream in the heat medium circuit 20 with respect to the heat-absorbing heat exchanger 12 and the heat-dissipating heat exchanger 14. The open/close state of the intermediate valve 60, the open/close state of each of the upstream valves 611 to 613, and the open/close state of each of the downstream valves 621 to 623 are controlled in accordance with an operation mode, whereby the supply destination of the heat medium is switched.

For example, in the cooling mode illustrated in FIG. 1, the low-temperature medium (indicated by the solid lines) that has dissipated heat to the refrigerant in the heat-dissipating heat exchanger 14 and has flowed out from the heat-dissipating heat exchanger 14 to a pipe 801 sequentially flows through a pipe 802 and a pipe 803 and is supplied to the vehicle-interior heat exchanger 30 in accordance with the open/close state of each port of the downstream valve 621 and the downstream valve 622. The low-temperature medium that has flowed out from the vehicle-interior heat exchanger 30 to a pipe 804 sequentially flows through pipes 805 and 806 and returns to the heat-dissipating heat exchanger 14 in accordance with the open/close states of the upstream valves 612 and 611.

On the other hand, the high-temperature medium (indicated by the dashed-dotted lines) that has absorbed heat from the refrigerant in the heat-absorbing heat exchanger 12 and has flowed out from the heat-absorbing heat exchanger 12 to a pipe 821, sequentially flows through the downstream valve 622, a pipe 822, the downstream valve 623, and a pipe 823, and is supplied to the second heat exchanger 42 and the first heat exchanger 41. Waste heat of the vehicle air conditioning system 1 can be discharged to outside air through heat exchange between the high-temperature medium and the outside air by the second heat exchanger 42 and the first heat exchanger 41. The high-temperature medium that has flowed out from the first heat exchanger 41 to a pipe 824 sequentially flows through pipes 825 and 826 and returns to the heat-absorbing heat exchanger 12 in accordance with the open/close states of the upstream valves 613 and 612.

In the heating mode illustrated in FIG. 2, the high-temperature medium that has absorbed heat from the refrigerant in the heat-absorbing heat exchanger 12 and has flowed out from the heat-absorbing heat exchanger 12 to the pipe 821 flows through the pipe 803 and is supplied to the vehicle-interior heat exchanger 30 in accordance with the open/close states of the ports of the downstream valve 622 and the downstream valve 621. The high-temperature medium that has flowed out from the vehicle-interior heat exchanger 30 to the pipe 804 flows through the pipe 826 and returns to the heat-absorbing heat exchanger 12 in accordance with the open/close states of the upstream valves 611 and 612.

On the other hand, the low-temperature medium that has dissipated heat to the refrigerant in the heat-dissipating heat exchanger 14 and has flowed out from the heat-dissipating heat exchanger 14 to the pipe 801, sequentially flows through the downstream valve 621, the pipe 807, and the pipe 823, and is supplied to the second heat exchanger 42 and the first heat exchanger 41. The heat medium can absorb heat from outside air through heat exchange between the low-temperature medium and the outside air in the second heat exchanger 42 and the first heat exchanger 41. The heat medium that has flowed out from the first heat exchanger 41 to the pipe 824 flows through the pipe 806 and returns to the heat-dissipating heat exchanger 14 in accordance with the open/close states of the upstream valves 611 and 613.

FIG. 3 illustrates a first defrosting processing P1 in the defrosting mode. The defrosting target during the first defrosting processing P1 is the first heat exchanger 41. FIG. 4 illustrates a second defrosting processing P2 in the defrosting mode. The defrosting target during the second defrosting processing P2 is the second heat exchanger 42.

In the defrosting mode, the first heat exchanger 41 and the second heat exchanger 42 are connected in parallel with respect to the flow of the heat medium, and the high-temperature medium is supplied to the vehicle-interior heat exchanger 30 and the vehicle-exterior heat exchangers 41 and 42 by switching the open/close states of the respective ports of the upstream valves 611 and 612 and the downstream valves 621 and 622.

In addition, one of the first heat exchanger 41 and the second heat exchanger 42 is selected as the defrosting target by switching the open/close states of the respective ports of the upstream valve 613 and the downstream valve 623.

As illustrated in FIG. 3, during the first defrosting processing P1, the high-temperature medium that has flowed out from the heat-absorbing heat exchanger 12 is supplied to the first heat exchanger 41 as the defrosting target via the downstream valve 622 and the downstream valve 623. At this time, the low-temperature medium that has flowed out from the heat-dissipating heat exchanger 14 is supplied to the second heat exchanger 42 via the downstream valve 621 and the downstream valve 623. During the first defrosting processing P1, since heat cannot be absorbed from outside air by the first heat exchanger 41 to which the high-temperature medium is supplied, heat is absorbed from outside air to the low-temperature medium only by the second heat exchanger 42.

As illustrated in FIG. 4, during the second defrosting processing P2, the high-temperature medium that has flowed out from the heat-absorbing heat exchanger 12 is supplied to the second heat exchanger 42 via the downstream valve 622 and the downstream valve 623. At this time, the low-temperature medium that has flowed out from the heat-dissipating heat exchanger 14 is supplied to the first heat exchanger 41 via the downstream valve 621 and the downstream valve 623. During the second defrosting processing P2, heat is absorbed from outside air to the low-temperature medium only by the first heat exchanger 41.

The number and the arrangement of the valves constituting the switching unit 6 according to the present embodiment, and the setting of the respective paths of the low-temperature medium and the high-temperature medium in each operation mode depending on the number and the arrangement, and the like are only examples. To achieve the respective flows of the low-temperature medium and the high-temperature medium in each operation mode provided in the vehicle air conditioning system 1, a switching unit having an appropriate configuration can be employed.

Control Device

Figure 5:
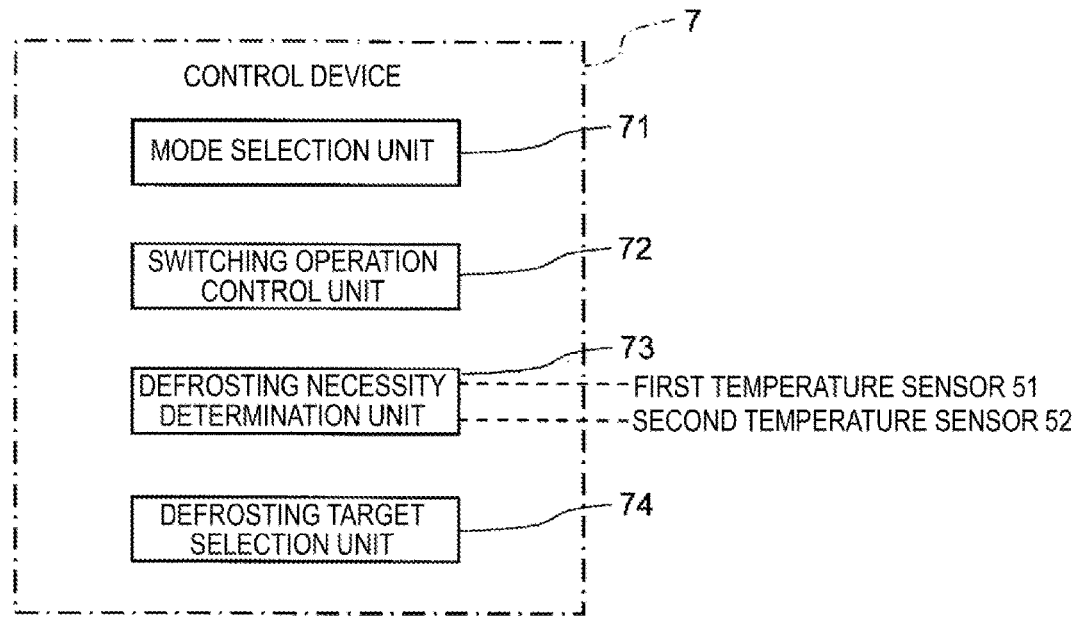
FIG. 5(a) is a block diagram illustrating a part of functions of a control device.
FIG. 5(b) is a schematic diagram illustrating a defrosting target selection chart.
Figure 5:
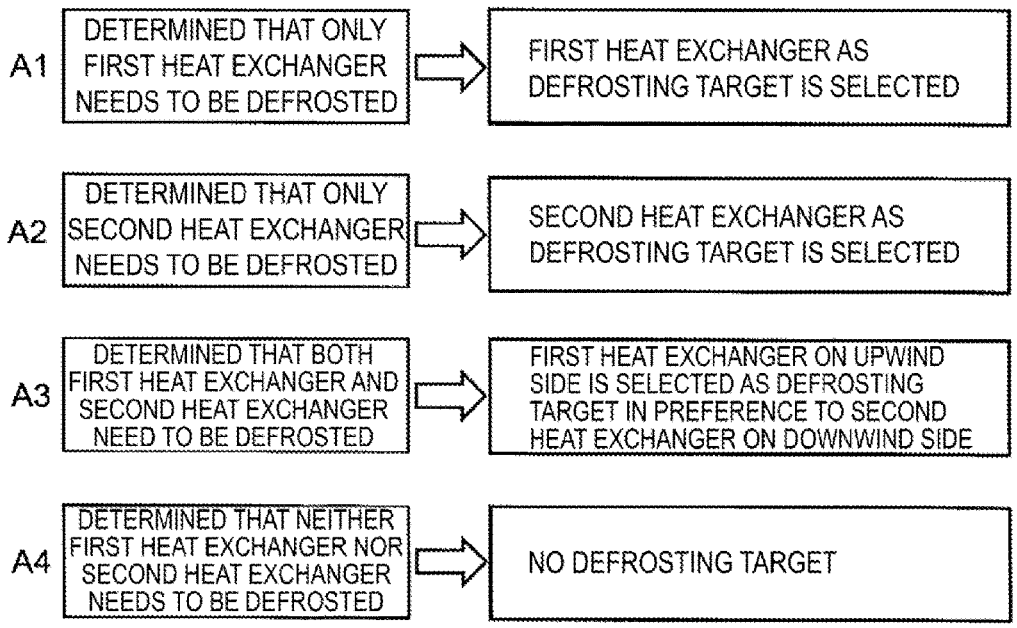

The control device 7 controls at least the operation of the switching unit 6 in the air conditioning system 1. FIG. 5(a) illustrates a mode selection unit 71 for selecting an operation mode and a switching operation control unit 72 for controlling the operation of the switching unit 6, and a defrosting necessity determination unit 73 and a defrosting target selection unit 74 for the defrosting operation, as some control modules included in the control device 7. Each control module is included in a computer program executed by a computer or an embedded program executed by an electronic circuit.

The mode selection unit 71 selects one operation mode from among a plurality of operation modes such as a cooling mode, a heating mode, and a defrosting mode in response to a user operation or under control by the control device 7.

The switching operation control unit 72 switches the flow of each of the high-temperature medium and the low-temperature medium in the heat medium circuit 20 by sending a control command to the valves 60, 611 to 613, and 621 to 623 of the switching unit 6 in accordance with the operation mode selected by the mode selection unit 71.

The defrosting necessity determination unit 73 determines the necessity of defrosting the first heat exchanger 41 on the basis of the detection result (temperature) by the first temperature detection unit 51. Before the start of the first defrosting processing P1 for defrosting the first heat exchanger 41, for example, the defrosting is determined to be necessary if the temperature detected by the first temperature detection unit 51 is lower than a predetermined first start threshold value $T_{s1}$, and the defrosting is determined to be unnecessary if the detected temperature is higher than the first start threshold value $T_{s1}$.

The same applies to the second heat exchanger 42. Before the start of the second defrosting processing P2 for defrosting the second heat exchanger 42, for example, the defrosting necessity determination unit 73 determines that the defrosting is necessary if the temperature detected by the second temperature detection unit 52 is lower than a predetermined second start threshold value $T_{s2}$, and determines that the defrosting is unnecessary if the detected temperature is higher than the second start threshold value $T_{s2}$.

The first start threshold value $T_{s1}$ can be set to an appropriate value in consideration of the degree of blockage of the air passages of the first heat exchanger 41. Similarly, the second start threshold value $T_{s2}$ can be set to an appropriate value in consideration of the degree of blockage of the air passages of the second heat exchanger 42. The first start threshold value $T_{s1}$ and the second start threshold value $T_{s2}$ may be identical to or different from each other.

After the start of the first defrosting processing P1, for example, if the temperature detected by the first temperature detection unit 51 is lower than a predetermined first finish threshold value $T_{f1}$ that is higher than the first start threshold value $T_{s1}$, the defrosting necessity determination unit 73 determines that the defrosting is still necessary and continues the first defrosting processing P1. If the detected temperature is higher than the first finish threshold value $T_{f1}$, the defrosting is determined to be no longer necessary, and the first defrosting processing P1 is terminated.

The same applies to the second heat exchanger 42. After the start of the second defrosting processing P2, for example, if the temperature detected by the second temperature detection unit 52 is lower than a predetermined second finish threshold value $T_{f2}$ that is higher than the second start threshold value $T_{s2}$, the defrosting necessity determination unit 73 determines that the defrosting is still necessary and continues the second defrosting processing P2. If the detected temperature is higher than the second finish threshold value $T_{f2}$, the defrosting is determined to be no longer necessary, and the second defrosting processing P2 is terminated.

The defrosting target selection unit 74 selects the defrosting target on the basis of the necessity of defrosting determined by the defrosting necessity determination unit 73 while giving preference to the first heat exchanger 41 on the upwind side.

FIG. 5(b) illustrates a logic used for the selection of the defrosting target by the defrosting target selection unit 74. There may be four cases A1 to A4 illustrated in FIG. 5(b) regarding the necessity of defrosting based on the detection result by the first temperature detection unit 51 and the detection result by the second temperature detection unit 52.

Case A1:

When it is determined that only the first heat exchanger 41 needs to be defrosted, the first heat exchanger 41 is selected as the defrosting target.

Case A2:

When it is determined that only the second heat exchanger 42 needs to be defrosted, the second heat exchanger 42 is selected as the defrosting target.

Case A3:

When it is determined that both the first heat exchanger 41 and the second heat exchanger 42 need to be defrosted, the first heat exchanger 41 located on the upwind side is selected as the defrosting target in preference to the second heat exchanger 42 located on the downwind side.

Case A4:

When it is determined that neither the first heat exchanger 41 nor the second heat exchanger 42 needs to be defrosted, neither the first heat exchanger 41 nor the second heat exchanger 42 is selected as the defrosting target. (There is no defrosting target)

Processing in Defrosting Mode

As an example of a processing procedure, processing in a defrosting mode M1 will be described with reference to FIG. 6. The processing in the defrosting mode M1 is indicated by being surrounded by a dashed line.

Figure 6:
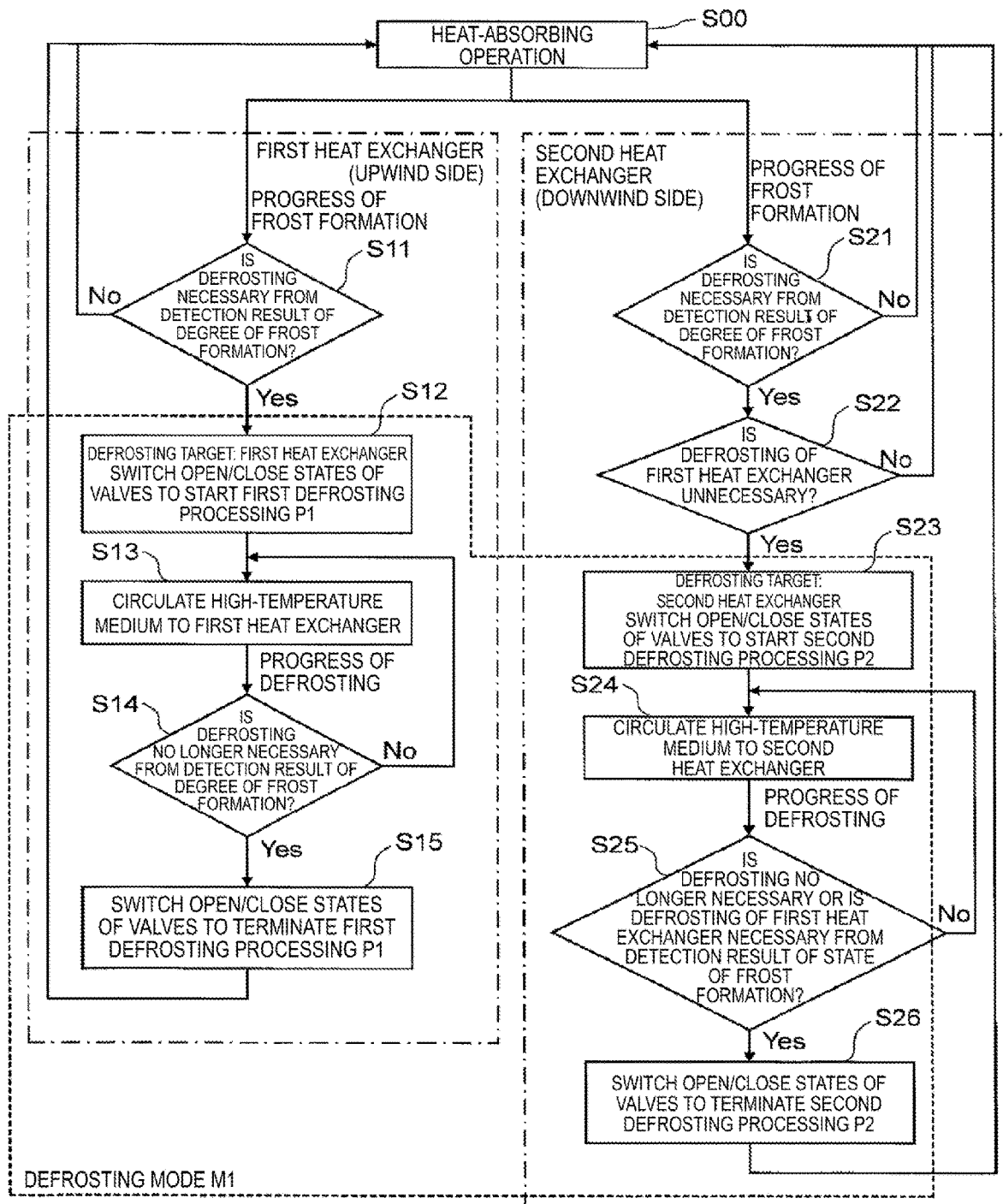
FIG. 6 is a flowchart illustrating a processing flow in the defrosting mode.

On the left side in FIG. 6, the processing related to the first heat exchanger 41 on the upwind side is indicated by being surrounded by a dashed-dotted line. On the right side in FIG. 6, the processing related to the second heat exchanger 42 on the downwind side is indicated by being surrounded by a dashed-dotted line. Note that the processing related to the second heat exchanger 42 includes the determination of necessity of defrosting for the first heat exchanger 41 (steps S22 and S25).

During a heat-absorbing operation (step S00) in which at least one of the first heat exchanger 41 or the second heat exchanger 42 is caused to perform a heat-absorbing operation, the determination of necessity of defrosting for the first heat exchanger 41 based on the detection result of the degree of frost formation by the first temperature detection unit 51 (steps S11 and S22) and the determination of necessity of defrosting for the second heat exchanger 42 based on the detection result of the degree of frost formation by the second temperature detection unit 52 (step S21) are performed in parallel.

When it is determined that neither the first heat exchanger 41 nor the second heat exchanger 42 needs to be defrosted (No in step S11 and No in step S21), there is no defrosting target, and the heat-absorbing operation (S00) is continued. This corresponds to the case A4 illustrated in FIG. 5(b).

During the heat-absorbing operation (step S00), when it is determined that the first heat exchanger 41 needs to be defrosted from the detection result of the degree of frost formation (Yes in step S11), the defrosting mode M1 is performed. Specifically, the first heat exchanger 41 is selected as the defrosting target by switching the open/close states of the valves 613, 623, and the like (case A1), and the first defrosting processing P1 is started (step S12). Even during the first defrosting processing P1, heating of the vehicle cabin 2 is continued by supplying the high-temperature medium to the vehicle-interior heat exchanger 30. The same applies to the second defrosting processing P2.

The first defrosting processing P1 is continuously performed until it is determined that the first heat exchanger 41 no longer needs to be defrosted from the detection result of the degree of frost formation (Yes in step S14).

When the first defrosting processing P1 is started and the high-temperature medium flows into the first heat exchanger 41 in accordance with the open/close states of the respective ports of the downstream valves 622 and 623 and the upstream valves 613 and 612, the frost adhering to the first heat exchanger 41 is melted by the heat of the high-temperature medium, whereby the defrosting proceeds (step S13). As a result, when it is determined that the first heat exchanger 41 no longer needs to be defrosted (Yes in step S14), the first defrosting processing P1 is terminated by switching the open/close states of the valves 613, 623, and the like (step S15).

On the other hand, during the heat-absorbing operation (step S00), when it is determined that the second heat exchanger 42 needs to be defrosted from the detection result of the degree of frost formation (Yes in step S21), the operation is shifted to the defrosting mode M1 only when it is determined that the first heat exchanger 41 does not need to be defrosted from the degree of frost formation on the first heat exchanger 41 (Yes in step S22). Specifically, the second heat exchanger 42 is selected as the defrosting target by switching the open/close states of the valves 613, 623, and the like (case A2), and the second defrosting processing P2 is started (step S23). Even when it is determined that the second heat exchanger 42 needs to be defrosted, if it is determined that the first heat exchanger 41 needs to be defrosted (No in step S22), the defrosting processing P2 for the second heat exchanger 42 is not performed. At this time, the first defrosting processing P1 is started or has already been performed on the basis of the fact that the first heat exchanger 41 needs to be defrosted (Yes in step S11). That is, in the case A3 where it is determined that both the first heat exchanger 41 and the second heat exchanger 42 need to be defrosted, the first heat exchanger 41 on the upwind side is preferentially selected as the defrosting target (step S12).

The second defrosting processing P2 is continuously performed until it is determined that the second heat exchanger 42 no longer needs to be defrosted as a result of the progress in the melting of the frost on the second heat exchanger 42 or until it is determined that the first heat exchanger 41 needs to be defrosted as a result of the progress in the frost formation on the first heat exchanger 41 during the second defrosting processing P2 (Yes in step S25). When it is determined in step S25 that the first heat exchanger 41 needs to be defrosted, that is, both the first heat exchanger 41 and the second heat exchanger 42 need to be defrosted (case A3), the defrosting processing P1 of the first heat exchanger 41 is given preference as in step S22.

During the second defrosting processing P2, heat is absorbed from outside air to the low-temperature medium only by the first heat exchanger 41 on the upwind side. As a result, the amount of heat exchanged between the outside air and the low-temperature medium decreases as compared with the case where heat is absorbed from the outside air to the low-temperature medium by the two heat exchangers 41 and 42, and thus the temperature of the low-temperature medium flowing through the first heat exchanger 41 decreases and the frost formation on the first heat exchanger 41 is likely to progress. When it is determined that the first heat exchanger 41 needs to be defrosted, the flow rate of the air flowing through the second heat exchanger 42 is reduced, and thus sufficient heat exchange in the second heat exchanger 42 cannot be expected regardless of the degree of frost formation on the second heat exchanger 42. Therefore, even when the defrosting of the second heat exchanger 42 is not completed yet (the second heat exchanger 42 needs to be defrosted), the open/close states of the valves 613, 623, and the like are switched to terminate the second defrosting processing P2 (step S26), and the processing proceeds to the first defrosting processing P1 (step S12).

When it is determined that the second heat exchanger 42 needs to be defrosted (Yes in step S21) at the time when the defrosting of the first heat exchanger 41 is finished (step S15), the defrosting of the first heat exchanger 41 is determined to be no longer necessary (Yes in step S22), and thus the processing is shifted from the first defrosting processing P1 to the second defrosting processing P2. Then, when the second defrosting processing P2 is finished (Yes in step S26), the operation can be returned from the defrosting mode M1 to the heating mode. In the heating mode, since heat is absorbed from outside air by the low-temperature medium flowing through the two heat exchangers 41 and 42 connected in series, the heating operation can be performed with the maximum capacity.

Main Actions and Effects of Present Embodiment

According to the vehicle air conditioning system 1 and the vehicle air conditioning method using the vehicle air conditioning system 1 of the present embodiment, the necessity of defrosting of each of the first heat exchanger 41 and the second heat exchanger 42 is determined on the basis of the degree of frost formation, and the first heat exchanger 41 and the second heat exchanger 42 are alternatively selected as the defrosting target while the first heat exchanger 41 on the upwind side is given preference over the second heat exchanger 42 on the downwind side.

Accordingly, when the flow rate of the air flowing through the second heat exchanger 42 decreases due to an increase in air resistance caused by the frost formation on the first heat exchanger 41 on the upwind side, the high-temperature medium is supplied to the first heat exchanger 41 before the supply of the high-temperature medium to the second heat exchanger 42 on the downwind side, whereby the amount of heat exchanged by the first heat exchanger 41 can be recovered by melting the frost on the first heat exchanger 41, and the air passages of the first heat exchanger 41 required for recovering the amount of heat exchanged by the second heat exchanger 42 can be maintained.

Since the defrosting processing P1 for the first heat exchanger 41 is performed in preference to the defrosting processing P2 for the second heat exchanger 42, the high-temperature medium distributed to the vehicle interior side and the vehicle exterior side are effectively used to recover the amount of heat exchanged by each of the first heat exchanger 41 and the second heat exchanger 42. Then, the first defrosting processing P1 is performed on the basis of the determination of the necessity of defrosting the first heat exchanger 41 (steps S11, S22, and S25), whereby the degree of frost formation on the first heat exchanger 41 on the upwind side is maintained to such an extent that the air flow rate is not excessively reduced over the time period during which the defrosting mode M1 is performed.

Therefore, according to the present embodiment, a heating capacity above a certain level can be ensured not only in the heating mode but also in the defrosting mode M1. Further, since the high-temperature medium is supplied to an appropriate place at an appropriate time, the first heat exchanger 41 and the second heat exchanger 42 as a whole can quickly finish the defrosting mode M1 and return to the heating mode.

Further, according to the vehicle air conditioning system 1 and the vehicle air conditioning method using the vehicle air conditioning system 1 of the present disclosure, the connection of the first heat exchanger 41 and the second heat exchanger 42 is switched to series connection or parallel connection by the switching unit 6 to set the respective paths of the high-temperature medium and the low-temperature medium, whereby it is possible to implement various operation modes including the cooling and heating modes in which the first and second heat exchangers 41 and 42 are connected in series and the defrosting mode in which the first and second heat exchangers 41 and 42 are connected in parallel with a simple structure and a simple control at low costs.

Modified Example

Besides the above-described embodiment, configurations explained in the above-described embodiment can be selected or omitted as desired or can be changed to other configurations as necessary.

Appropriately setting the respective paths of the high-temperature medium and the low-temperature medium in accordance with the open/close state of each valve as the switching unit 6 can implement not only the above-described embodiment but also various kinds of operation modes. For example, the vehicle air conditioning system 1 may have a freeze cleaning mode in which frost is formed on the vehicle-interior heat exchanger 30 by supplying the low-temperature medium to the vehicle-interior heat exchanger 30, and then the surface of the vehicle-interior heat exchanger 30 is cleaned by melting the frost by supplying the high-temperature medium to the vehicle-interior heat exchanger 30.

In the cooling mode or the heating mode, it is not excluded that the first heat exchanger 41 and the second heat exchanger 42 are connected in parallel with respect to the flow of the heat medium, or that only one of the first and second heat exchangers 41 and 42 is connected to the heat medium circuit for operation.

The vehicle air conditioning system of the present disclosure may include three or more vehicle-exterior heat exchangers. For example, in addition to the first heat exchanger 41 and the second heat exchanger 42 described above, a third heat exchanger may be disposed in series with the first heat exchanger 41 and the second heat exchanger 42 with respect to the flow of air caused by the air blower. In that case, the degree of frost formation of each of the first to third heat exchangers is detected by the detection unit 5 to determine whether the defrosting of each of the first to third heat exchangers is necessary. Similar to the above-described embodiment, one of the first to third heat exchangers connected in parallel with respect to the flow of the heat medium that is determined to be in need of the defrosting is selected as a defrosting target. When two or more of the first to third heat exchangers are determined to be in need of the defrosting, the defrosting is preferentially performed on the heat exchanger that is located relatively upwind among the heat exchangers determined to be in need of the defrosting. For example, before the start of the defrosting processing on the third heat exchanger, the necessity of defrosting the third heat exchanger is determined, and the necessity of defrosting the first heat exchanger 41 and the necessity of defrosting the second heat exchanger 42 are also determined. When it is determined that the first heat exchanger 41 or the second heat exchanger 42 needs to be defrosted after the start of the defrosting processing on the third heat exchanger, the defrosting processing on the third heat exchanger is terminated.

As the detection unit 5 for detecting the degree of frost formation on each of the first heat exchanger 41 and the second heat exchanger 42, for example, a camera for capturing images of the external appearances of the first heat exchanger 41 and the second heat exchanger 42 can be used in addition to the temperature detection units 51 and 52. For example, image data indicating the degree of frost formation on each of the first heat exchanger 41 and the second heat exchanger 42 can be acquired by one camera. The defrosting necessity determination unit 73 can determine the necessity of defrosting each of the first heat exchanger 41 and the second heat exchanger 42 by image processing of the image data.

Supplementary Notes

The vehicle air conditioning system and the vehicle air conditioning method described above are understood as follows.

[1] A vehicle air conditioning system 1 includes: a refrigerant circuit 10 in which a refrigerant circulates in accordance with a refrigeration cycle; a heat medium circuit 20 including a high-temperature medium circuit 22 in which a heat medium absorbing heat from the refrigerant in the refrigerant circuit 10 circulates and a low-temperature medium circuit 21 in which the heat medium dissipating heat to the refrigerant in the refrigerant circuit 10 circulates; a vehicle-interior heat exchanger 30 configured to exchange heat between the heat medium and air; a vehicle-exterior heat exchanger configured to exchange heat between the heat medium and air and including a first heat exchanger 41 and a second heat exchanger 42 disposed in series with respect to a flow of air generated by a blower 43; a switching unit 6 configured to switch a flow of the heat medium; a detection unit 5 configured to detect a degree of frost formation on each of the first heat exchanger 41 and the second heat exchanger 42; and a control device 7 configured to control operation of the switching unit 6 in accordance with an operation mode of the vehicle air conditioning system 1.

The operation mode includes a defrosting mode M1 in which the heat medium in the high-temperature medium circuit 22 is supplied to a defrosting target to be selected as either the first heat exchanger 41 or the second heat exchanger 42 connected in parallel in the heat medium circuit 20 by the operation of the switching unit 6.

In selecting the defrosting target by the operation of the switching unit 6 and on the basis of the detection result of a degree of frost formation by the detection unit 5, the control device 7 selects the first heat exchanger 41 as the defrosting target when it is determined that only the first heat exchanger 41 needs to be defrosted, selects the second heat exchanger 42 as the defrosting target when it is determined that only the second heat exchanger 42 needs to be defrosted, and selects, as the defrosting target, the first heat exchanger 41 located on an upwind side in preference to the second heat exchanger 42 located on a downwind side when it is determined that both the first heat exchanger 41 and the second heat exchanger 42 need to be defrosted.

[2] The control device 7 includes a defrosting necessity determination unit 73 that determines the necessity of defrosting each of the first heat exchanger 41 and the second heat exchanger 42 on the basis of the detection result, and a defrosting target selection unit 74 that selects the defrosting target on the basis of the necessity of defrosting determined by the defrosting necessity determination unit 73 while giving preference to the first heat exchanger 41 on the upwind side. The defrosting target selection unit 74 starts a first defrosting processing P1 for supplying the heat medium in the high-temperature medium circuit 22 to the first heat exchanger 41 as the defrosting target when it is determined that the first heat exchanger 41 needs to be defrosted, terminates the first defrosting processing P1 after start of the first defrosting processing and when it is determined that the first heat exchanger 41 no longer needs to be defrosted, starts a second defrosting processing P2 for supplying the heat medium of the high-temperature medium circuit 22 to the second heat exchanger 42 as the defrosting target when it is determined that the second heat exchanger 42 needs to be defrosted and when it is determined that the first heat exchanger 41 does not need to be defrosted, and terminates the second defrosting processing P2 after start of the second defrosting processing P2 and when it is determined that the first heat exchanger 41 needs to be defrosted or when it is determined that the second heat exchanger 42 no longer needs to be defrosted.

[3] The vehicle air conditioning system 1 includes, as the detection unit 5, a first temperature detection unit 51 configured to detect temperature information indicating a temperature decrease of the heat medium due to a frost formation on the first heat exchanger 41 and a second temperature detection unit 52 configured to detect temperature information indicating a temperature decrease of the heat medium due to a frost formation on the second heat exchanger 42.

[4] The operation mode includes a heating mode in which the heat medium in the low-temperature medium circuit 21 is supplied to the first heat exchanger 41 and the second heat exchanger 42 connected in series by the operation of the switching unit 6. In the heating mode, the heat medium flows through the second heat exchanger 42 and the first heat exchanger 41 from the downwind side to the upwind side.

[5] The switching unit 6 includes a three-way valve located between the first heat exchanger 41 and the second heat exchanger 42.

[6] In an air conditioning method using a vehicle air conditioning system 1, the vehicle air conditioning system 1 includes: a refrigerant circuit 10 in which a refrigerant circulates in accordance with a refrigeration cycle; a heat medium circuit 20 including a high-temperature medium circuit 22 in which a heat medium absorbing heat from the refrigerant circulates and a low-temperature medium circuit in which the heat medium dissipating heat to the refrigerant circulates; a vehicle-interior heat exchanger 30 configured to exchange heat between the heat medium and air; a vehicle-exterior heat exchanger configured to exchange heat between the heat medium and air and including a first heat exchanger 41 and a second heat exchanger 42 disposed in series with respect to a flow of air generated by a blower 43; and a switching unit 6 configured to switch a flow of the heat medium. The air conditioning method of the present disclosure includes: in supplying the heat medium in the high-temperature medium circuit 22 to a defrosting target to be selected as either the first heat exchanger 41 or the second heat exchanger 42 connected in parallel by an operation of the switching unit 6 and on the basis of a detection result of a degree of frost formation on each of the first heat exchanger 41 located on an upwind side and the second heat exchanger 42 located on a downwind side, selecting the first heat exchanger 41 as the defrosting target when it is determined that only the first heat exchanger 41 needs to be defrosted; selecting the second heat exchanger 42 as the defrosting target when it is determined that only the second heat exchanger 42 needs to be defrosted; and selecting, as the defrosting target, the first heat exchanger 41 in preference to the second heat exchanger 42 when it is determined that both the first heat exchanger 41 and the second heat exchanger 42 need to be defrosted.

[7] The air conditioning method of the present disclosure includes: in defrosting each of the first heat exchanger 41 and the second heat exchanger 42 while selecting the defrosting target on the basis of the degree of frost formation determined by the detection result while giving preference to the first heat exchanger 41, starting a first defrosting processing P1 for supplying the heat medium in the high-temperature medium circuit 22 to the first heat exchanger 41 as the defrosting target when it is determined that the first heat exchanger 41 needs to be defrosted; terminating the first defrosting processing P1 after start of the first defrosting processing P1 and when it is determined that the first heat exchanger 41 no longer needs to be defrosted; starting a second defrosting processing P2 for supplying the heat medium of the high-temperature medium circuit 22 to the second heat exchanger 42 as the defrosting target when it is determined that the second heat exchanger 42 needs to be defrosted and when it is determined that the first heat exchanger 41 does not need to be defrosted; and terminating the second defrosting processing P2 after start of the second defrosting processing P2 and when it is determined that the first heat exchanger 41 needs to be defrosted or when it is determined that the second heat exchanger 42 no longer needs to be defrosted.

REFERENCE SIGNS LIST

1 Vehicle air conditioning system
2 Vehicle cabin
3 HVAC unit
5 Detection unit
6 Switching unit
7 Control device
10 Refrigerant circuit
11 Compressor
12 Heat-absorbing heat exchanger
13 Expansion valve
14 Heat-dissipating heat exchanger
20 Heat Medium Circuit
21 Low-temperature medium circuit
21P Pump
22 High-temperature medium circuit
22P Pump
30 Vehicle-interior heat exchanger
33 Blower
40 Vehicle-exterior heat exchanger
41 First heat exchanger
42 Second heat exchanger
43 Blower (air blower)
51 First temperature detection unit
52 Second temperature detection unit
60 Intermediate valve
71 Mode selection unit
72 Switching operation control unit
73 Defrosting necessity determination unit
74 Defrosting target selection unit
611 to 613 Upstream valve
621 to 623 Downstream valve
801 to 811 Pipe
821 to 826 Pipe
M1 Defrosting mode
P1 First defrosting processing
P2 Second defrosting processing
S00, S11 to S15, S21 to S26 Step
$T_{s1}$ First start threshold value
$T_{f1}$ First finish threshold value
$T_{s2}$ Second start threshold value
$T_{f2}$ Second finish threshold value

The invention claimed is:
1. A vehicle air conditioning system, comprising:
a refrigerant circuit in which a refrigerant circulates in accordance with a refrigeration cycle;

a heat medium circuit including a high-temperature medium circuit in which a heat medium absorbing heat from the refrigerant in the refrigerant circuit circulates and a low-temperature medium circuit in which a heat medium dissipating heat to the refrigerant in the refrigerant circuit circulates;

a vehicle-interior heat exchanger configured to exchange heat between the heat medium and air;

a vehicle-exterior heat exchanger configured to exchange heat between the heat medium and air and including a first heat exchanger and a second heat exchanger disposed in series with respect to a flow of air generated by an air blower;

a switching unit configured to switch a flow of the heat medium;

a detection unit configured to detect a degree of frost formation on each of the first heat exchanger and the second heat exchanger; and a control device configured to control operation of the switching unit in accordance with an operation mode of the vehicle air conditioning system, wherein the operation mode includes a defrosting mode in which the heat medium in the high-temperature medium circuit is supplied to a defrosting target to be selected as either the first heat exchanger or the second heat exchanger connected in parallel in the heat medium circuit by the operation of the switching unit, and in selecting the defrosting target by the operation of the switching unit and on the basis of a detection result of the degree of frost formation by the detection unit, the control device selects the first heat exchanger as the defrosting target when it is determined that only the first heat exchanger needs to be defrosted, selects the second heat exchanger as the defrosting target when it is determined that only the second heat exchanger needs to be defrosted, and selects, as the defrosting target, the first heat exchanger located on an upwind side in preference to the second heat exchanger located on a downwind side when it is determined that both the first heat exchanger and the second heat exchanger need to be defrosted.

2. The vehicle air conditioning system according to claim 1, wherein the control device includes a defrosting necessity determination unit configured to determine necessity of defrosting each of the first heat exchanger and the second heat exchanger on the basis of the detection result and a defrosting target selection unit configured to select the defrosting target on the basis of the necessity of defrosting determined by the defrosting necessity determination unit while giving preference to the first heat exchanger on the upwind side, and the defrosting target selection unit starts a first defrosting processing for supplying the heat medium in the high-temperature medium circuit to the first heat exchanger as the defrosting target when it is determined that the first heat exchanger needs to be defrosted, terminates the first defrosting processing after start of the first defrosting processing and when it is determined that the first heat exchanger no longer needs to be defrosted, starts a second defrosting processing for supplying the heat medium in the high-temperature medium circuit to the second heat exchanger as the defrosting target when it is determined that the second heat exchanger needs to be defrosted and when it is determined that the first heat exchanger does not need to be defrosted, and terminates the second defrosting processing after start of the second defrosting processing and when it is determined that the first heat exchanger needs to be defrosted or when it is determined that the second heat exchanger no longer needs to be defrosted.

3. The vehicle air conditioning system according to claim 1, wherein the detection unit includes a first temperature detection unit configured to detect temperature information indicating a temperature decrease of the heat medium due to a frost formation on the first heat exchanger and a second temperature detection unit configured to detect temperature information indicating a temperature decrease of the heat medium due to a frost formation on the second heat exchanger.

4. The vehicle air conditioning system according to claim 1, wherein the operation mode includes a heating mode in which the heat medium in the low-temperature medium circuit is supplied to the first heat exchanger and the second heat exchanger connected in series by the operation of the switching unit, and in the heating mode, the heat medium flows through the second heat exchanger and the first heat exchanger from the downwind side to the upwind side.

5. The vehicle air conditioning system according to claim 1, wherein the switching unit includes a three-way valve located between the first heat exchanger and the second heat exchanger.

6. A vehicle air conditioning method using a vehicle air conditioning system, the vehicle air conditioning system comprising:

a refrigerant circuit in which a refrigerant circulates in accordance with a refrigeration cycle;

a heat medium circuit including a high-temperature medium circuit in which a heat medium absorbing heat from the refrigerant in the refrigerant circuit circulates and a low-temperature medium circuit in which the heat medium dissipating heat to the refrigerant in the refrigerant circuit circulates;

a vehicle-interior heat exchanger configured to exchange heat between the heat medium and air;

a vehicle-exterior heat exchanger configured to exchange heat between the heat medium and air and including a first heat exchanger and a second heat exchanger disposed in series with respect to a flow of air generated by an air blower; and a switching unit configured to switch a flow of the heat medium, the vehicle air conditioning method comprising:

in supplying the heat medium in the high-temperature medium circuit to a defrosting target to be selected as either the first heat exchanger or the second heat exchanger connected in parallel by operation of the switching unit and on the basis of a detection result of a degree of frost formation on each of the first heat exchanger located on an upwind side and the second heat exchanger located on a downwind side, selecting the first heat exchanger as the defrosting target when it is determined that only the first heat exchanger needs to be defrosted;

selecting the second heat exchanger as the defrosting target when it is determined that only the second heat exchanger needs to be defrosted; and selecting, as the defrosting target, the first heat exchanger in preference to the second heat exchanger when it is determined that both the first heat exchanger and the second heat exchanger need to be defrosted.

7. The vehicle air conditioning method according to claim 6, comprising:

in defrosting each of the first heat exchanger and the second heat exchanger while selecting the defrosting target on the basis of the degree of frost formation determined by the detection result while giving preference to the first heat exchanger, starting a first defrosting processing for supplying the heat medium in the high-temperature medium circuit to the first heat exchanger as the defrosting target if it is determined that the first heat exchanger needs to be defrosted;

terminating the first defrosting processing after start of the first defrosting processing and if it is determined that the first heat exchanger no longer needs to be defrosted;

starting a second defrosting processing for supplying the heat medium in the high-temperature medium circuit to the second heat exchanger as the defrosting target when it is determined that the second heat exchanger needs to be defrosted and when it is determined that the first heat exchanger does not need to be defrosted; and terminating the second defrosting processing after start of the second defrosting processing and when it is determined that the first heat exchanger needs to be defrosted or when it is determined that the second heat exchanger no longer needs to be defrosted.

* * * * *